United States Patent
Alacqua et al.

(10) Patent No.: US 7,823,955 B2
(45) Date of Patent: Nov. 2, 2010

(54) SUNSHADE DEVICE FOR MOTOR-VEHICLES, WITH SHAPE MEMORY ACTUATOR

(75) Inventors: Stefano Alacqua, Rivoli Cascine Vica (IT); Gianluca Capretti, Orbassano (IT); Marco Biasiotto, Turin (IT); Alessandro Zanella, Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 12/457,985

(22) Filed: Jun. 26, 2009

(65) Prior Publication Data

US 2009/0284039 A1 Nov. 19, 2009

Related U.S. Application Data

(62) Division of application No. 11/714,170, filed on Mar. 6, 2007, now abandoned.

(30) Foreign Application Priority Data

Mar. 8, 2006 (EP) .................. 06425155

(51) Int. Cl.
*B60J 3/02* (2006.01)
(52) U.S. Cl. ................. 296/97.4; 296/97.8; 160/370.22
(58) Field of Classification Search ................. 297/97.4, 297/97.8; 60/528; 160/370.22
See application file for complete search history.

(56) References Cited

U.S. PATENT DOCUMENTS

| 4,836,263 | A | 6/1989 | Ament |
| 5,076,633 | A | 12/1991 | Hsu et al. |
| 5,133,585 | A | 7/1992 | Hassan |
| 5,472,255 | A | 12/1995 | Moore |
| 5,947,544 | A | 9/1999 | Hubeshi |
| 2002/0033616 | A1 | 3/2002 | Schlecht et al. |

FOREIGN PATENT DOCUMENTS

| DE | 199 22 586 A1 | 2/2000 |
| FR | 2 168 331 | 8/1973 |
| FR | 2 387 812 | 11/1978 |
| JP | 62-6824 | 1/1987 |

OTHER PUBLICATIONS

Patent Abstracts of Japan, vol. 010, No. 196, Jul. 10, 1986 & JP 61 041620, Feb. 28, 1986.

*Primary Examiner*—Dennis H Pedder
(74) *Attorney, Agent, or Firm*—Nixon & Vanderhye P.C.

(57) ABSTRACT

A sunshade device comprises a sunshade in the form of a roller blind forming part of a roller-blind device, comprising a supporting structure, a shaft for rolling of the sunshade blind, mounted so that it can rotate on the aforesaid supporting structure, and a shape-memory actuator device for causing displacement of the blind from the rolled-up condition to the distended condition.

4 Claims, 12 Drawing Sheets

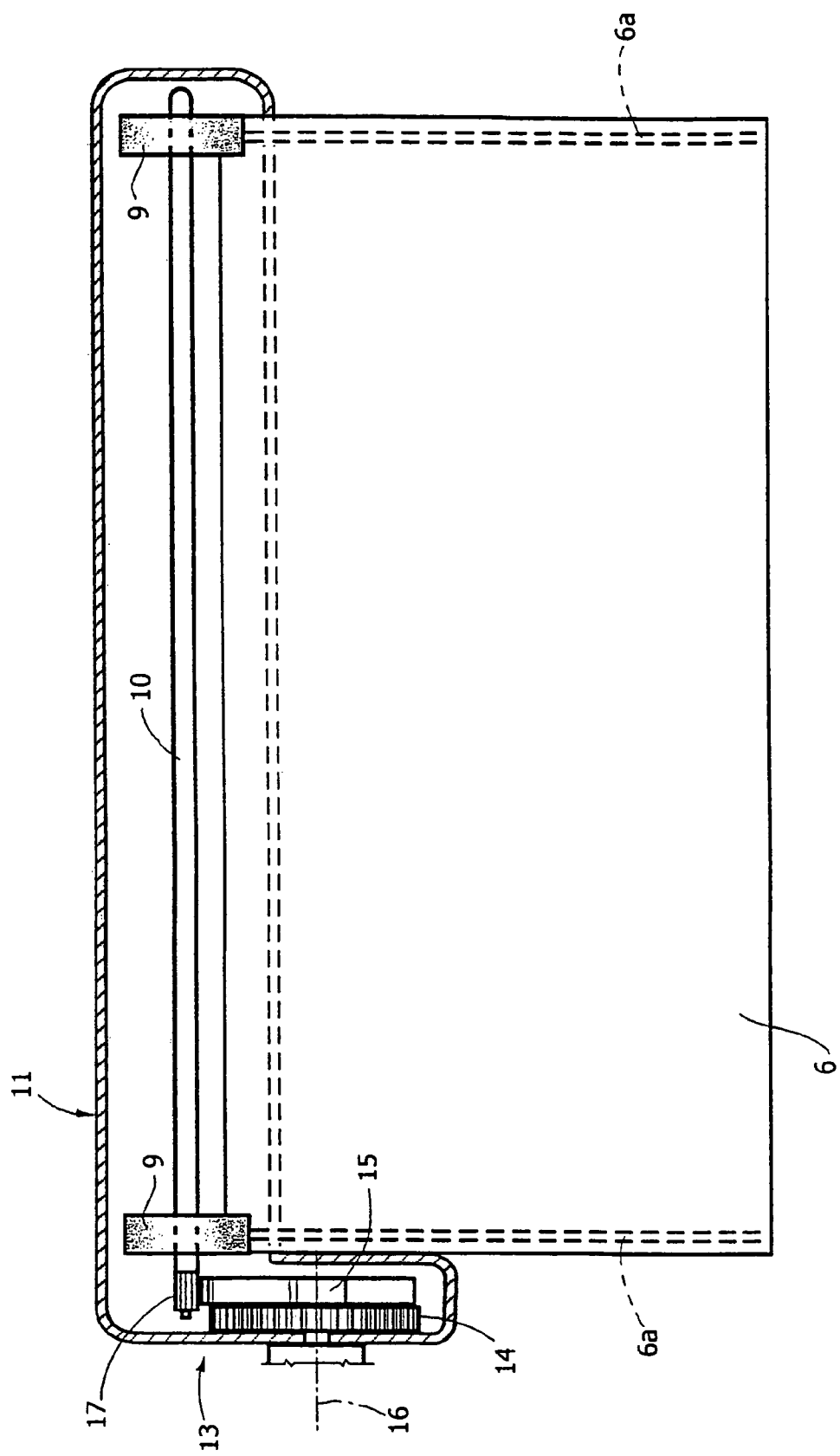

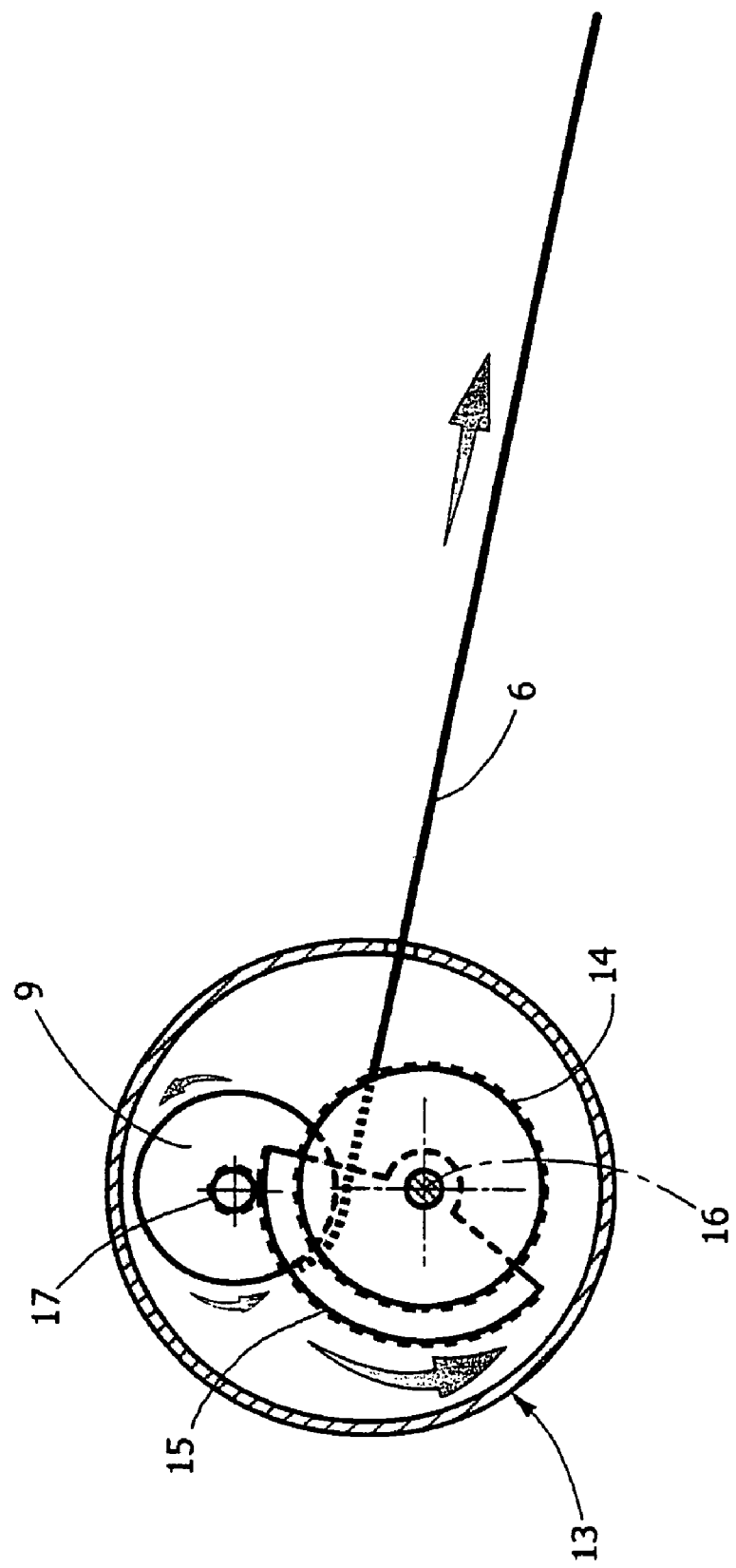

SUNSHADE DEVICE FOR MOTOR-VEHICLES, WITH SHAPE MEMORY ACTUATOR

This application is a divisional application from U.S. patent application Ser. No. 11/714,170 filed on Mar. 6, 2007 now abandoned, the entire contents of which are hereby incorporated by reference, which claims priority from EP 06425155.6, the entire contents of which are hereby incorporated by reference.

BACKGROUND OF THE INVENTION

The present invention relates to a sunshade device for motor vehicles, comprising a sunshade that can be displaced between an inoperative position and an operative position with respect to a supporting structure, and a shape-memory actuator for controlling displacement of the sunshade from its inoperative position to its operative position.

A device of the type referred to above is described and illustrated in the document No. JP-A-62 006824. In the case of said known device, the sunshade is in the form of a panel guided in a slidable way between an inoperative position where it is retracted within a casing and an extracted operative position. On account of the dimensions of the sunshade, the casing that receives it in the inoperative condition has a relatively large encumbrance in the longitudinal direction of the motor vehicle. Said aspect constitutes a drawback, particularly in the case of vehicles equipped with sunroof with window. In this case, in fact, the front cross member of the roof, which delimits at the front the opening of the window, must present a dimension in the longitudinal direction of the motor vehicle that is relatively large, which makes it impossible for the driver and the passenger sitting in the front seat of the motor vehicle to enjoy fully the advantages of the window present on the roof. Said circumstance is highlighted in FIG. 1 of the annexed plate of drawings, which shows a partial view of a motor vehicle 1, equipped with a windscreen 2 and a roof 3 with a window 4 delimited at the front by a cross member 5. In the case of application of the device according to the known art, the cross member 5 has, as clearly illustrated in FIG. 1, a dimension in the longitudinal direction A of the motor vehicle that is relatively large, in so far as each of the sunshades 6 must be received, in its own inoperative condition, within said cross member 5. Consequently, the front edge 7 of the window 4 made in the roof 3 is sensibly retracted, a fact which, as has been said, does not enable the driver of the motor vehicle and the passenger sitting in the front seat to enjoy fully the advantages of the window on the roof.

SUMMARY OF THE INVENTION

The main purpose of the present invention is to overcome the aforesaid drawback.

A further purpose is to provide a sunshade device with shape-memory actuation that is simple, has small overall dimensions, and is efficient and quiet during operation.

With a view to achieving said purpose, the subject of the invention is a sunshade device having the characteristics referred to at the start of the present description and further characterized in that the aforesaid sunshade is constituted by the blind of a roller-blind device, comprising a supporting structure and a shaft on which the blind is rolled up, which is mounted on the supporting structure so that it can rotate, said shape-memory actuator comprising at least one shape-memory element that can be activated for controlling movement of the roller blind from the rolled-up condition to the distended condition.

Thanks to the characteristic indicated above, in the condition where it is installed on the motor vehicle, the device according to the invention has small overall dimensions in the longitudinal direction of the motor vehicle, which enables sensible reduction in the transverse dimension of the front cross member of the roof panel with consequent advantages in the case where the vehicle is equipped with a sun roof with window. Of course, the invention can in any case be applied with practical advantage also on motor vehicles not provided with sunroof with a window.

The shape-memory actuator can be of the type in which a shape-memory actuator element controls the movement of the sunshade only from its inoperative position to its operative position, engagement means being provided for withholding the sunshade in its operative position once this has been reached so as to enable de-activation of the shape-memory element. In the case of said solution, there are provided means for de-activating the engagement means and elastic means that bring back the sunshade into its inoperative position.

In a second solution, a first shape-memory actuator element and a second shape-memory actuator element are provided for controlling movement of the sunshade into the operative position or into the inoperative position, respectively.

In a third solution, the shape-memory actuator is of a bistable type, i.e., of the type in which each successive activation of the shape-memory actuator brings about movement of the sunshade from the inoperative position into the operative position or vice versa, the sunshade remaining each time in the position reached after de-activation of the actuator.

The shape-memory element is preferably of the type that can be activated by electrical-supply means, which cause passage of an electric current through the shape-memory element, so as to heat it by the Joule effect beyond its transition temperature.

According to a further characteristic of the invention, the roller blind constituting the sunshade has two longitudinal edges provided with a stiffening element in such a way that, in the distended condition, the sunshade has a substantially rigid and self-bearing configuration and projects in cantilever fashion from the roller-blind casing.

The supporting structure of the roller blind is in turn connected to a fixing bracket by means of an articulated joint, which enables orientation of the sunshade in any desired position, for example in such a way as to lay it out parallel to the windscreen or parallel to a side window of the motor vehicle or in order adjust the angle of inclination of the blind in its distended configuration.

In an example of embodiment, the shape-memory actuator comprises an elongated shape-memory element wound within a casing and made in such a way as to control rotation of the shaft for rolling-up of the blind via a gear transmission. The wound shape-memory device can be, for example, of the type forming the subject of the copending European patent application No. 06425135.8 filed in the name of the present applicant.

In a variant, the shape-memory actuator can comprise one or more shape-memory wires arranged so as to bring about rotation of respective pulleys connected in rotation to arms for supporting the end edge of the blind, which can oscillate between a retracted position and an extracted position in which they cause unrolling of the blind from the roller device.

BRIEF DESCRIPTION OF THE DRAWINGS

Further characteristics and advantages of the invention will emerge from the ensuing description with reference to the annexed plate of drawings, which are provided purely by way of non-limiting example and in which:

FIGS. 5, 6 and 7, 8 illustrate the aforesaid inoperative and operative conditions of the device of FIGS. 3 and 4 in a front view and in a side view, respectively;

DETAILED DESCRIPTION OF THE INVENTION

Figure 1:
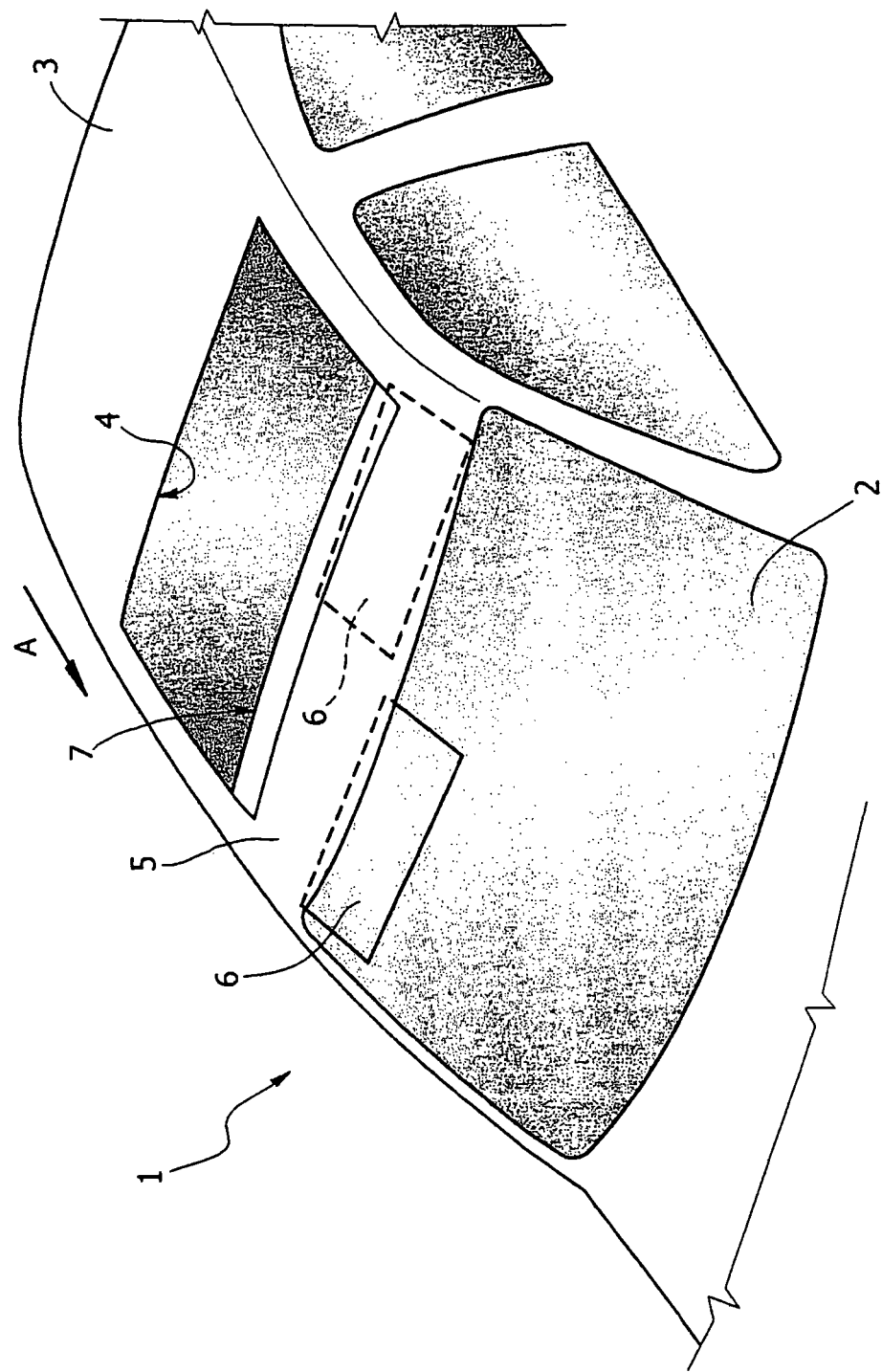
FIG. 1 is a partial perspective view of a motor vehicle equipped with a sunshade shape-memory-actuator device according to the known art.

As has already been described above, FIG. 1 shows the application of a sunshade shape-memory-actuator device according to the known art, for example of the type illustrated in the document No. JP-A-62 006 824, applied to a motor vehicle equipped with a sunroof with window. As discussed above, in said application the disadvantage due to the encumbrance of the device in the longitudinal direction A of the motor vehicle is evident, in that it entails a very retracted positioning of the front edge 7 of the window 4 of the roof.

Figure 2:
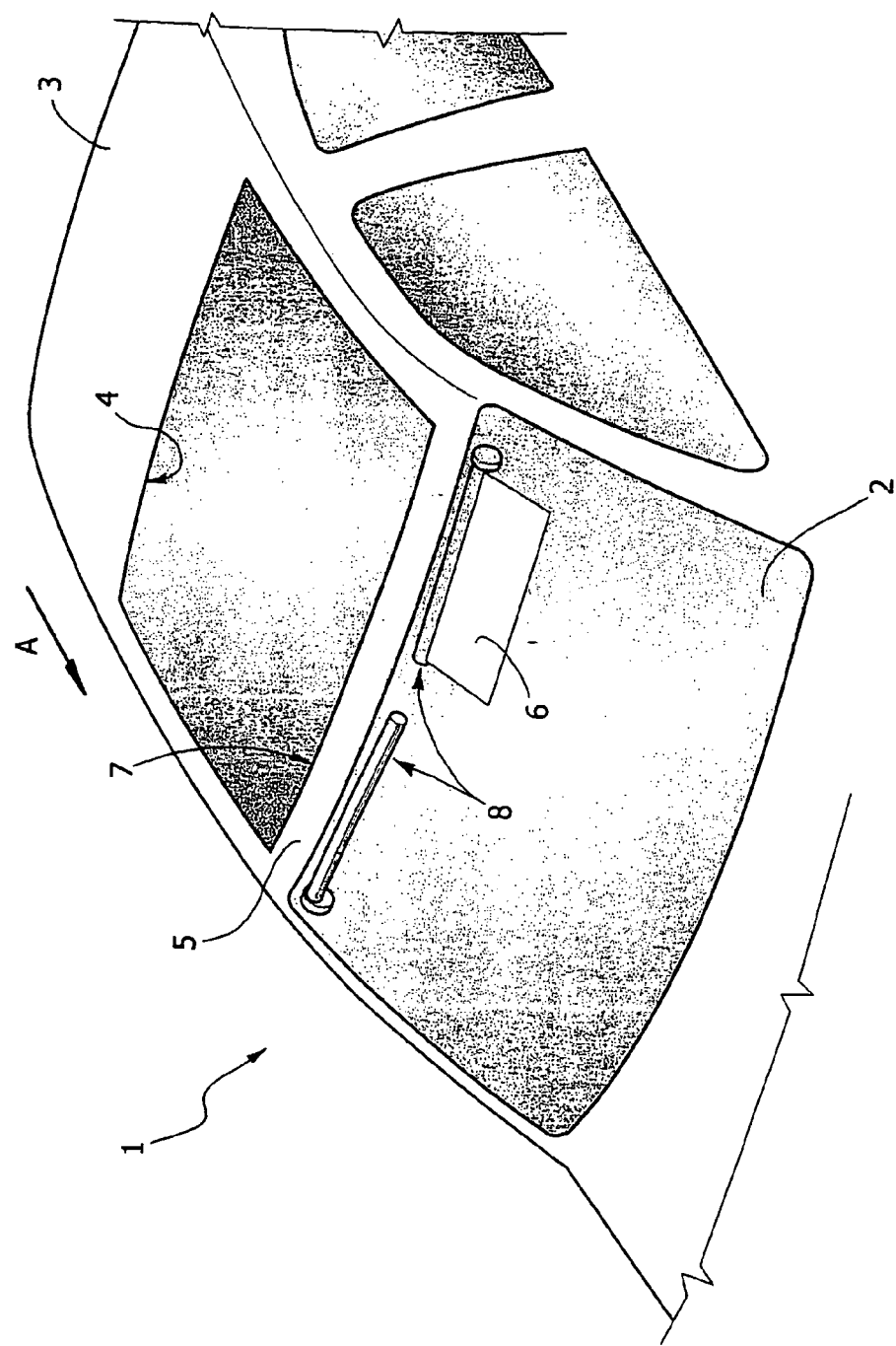
FIG. 2 is a view corresponding to that of FIG. 1, which shows a motor vehicle provided with a device according to the invention.

FIG. 2 illustrates a similar application of a device provided in accordance with the teachings of the present invention. In this case, the front cross member 5 of the roof panel 3 of the motor vehicle has a very small dimension in the longitudinal direction A, which entails a very advanced positioning of the front edge 7 of the window 4 made in the roof 3. In this way, also the driver and the passenger sitting in the front seat can enjoy fully the advantages of the window 4.

As may already be seen schematically from FIG. 2, the motor vehicle is equipped with one or more sunshade devices 8. In the case in point, two devices are provided, designed to be used respectively by the driver and by the passenger occupying the front seat adjacent to the driver. There is nothing, however, to rule out similar devices possibly being provided, for example, in areas corresponding to the rear side windows so as to be used by the passengers occupying the rear seats of the motor vehicle.

Each device 8 is substantially constituted by a roller blind supported in an orientable way by a bracket fixed to the structure of the motor vehicle.

With reference to the embodiment illustrated in FIGS. 3-8, the sunshade proper, designated by the reference number 6, is constituted by the roller blind of a roller-blind device. The blind 6 can be made of fabric or of a synthetic material and incorporates along its longitudinal edges two flexible-metal strips 6a, which wind within the casing of the device in the rolled-up condition of the blind, but have in any case a stiffness sufficient to maintain the blind 6 substantially in tension and rigid, i.e., self-bearing, in its distended condition in cantilever fashion outside the roller-blind casing.

Figure 5:
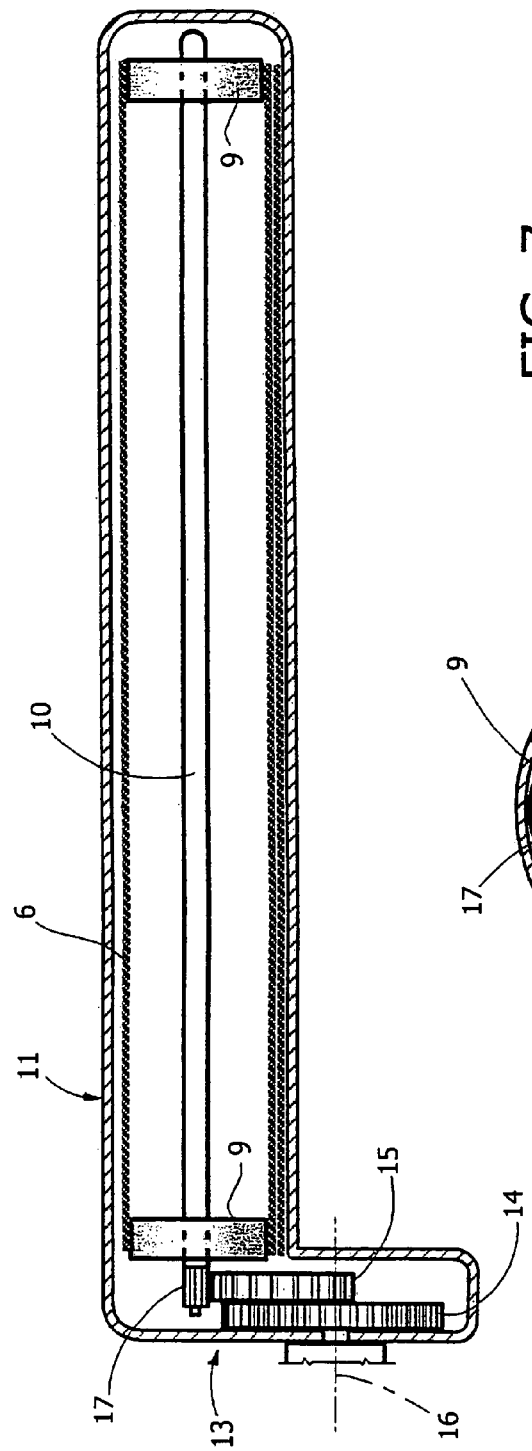
Figure 7:
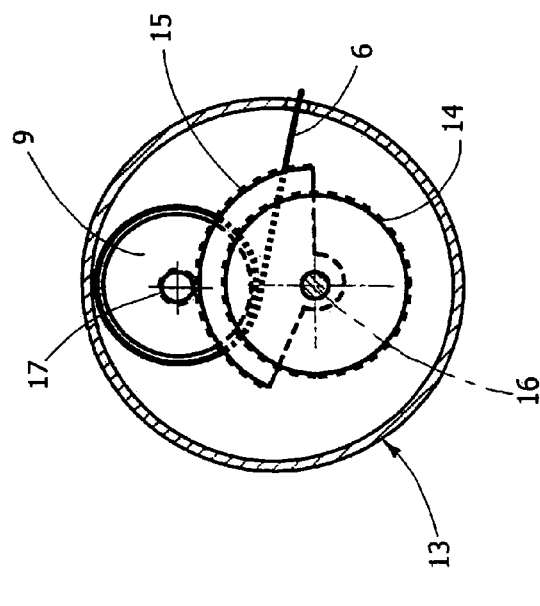

As may be seen in particular from FIGS. 5 and 6, the blind 6 rolls up on two end rollers 9 carried by a winding shaft 10, which is supported, in such a way that it can rotate, within a cylindrical casing 11 having a slit 12 from which the blind 6 comes out. Rotation of the winding shaft 10 is driven by a shape-memory actuator 13 of which the drawings show the outer casing. The shape-memory actuator 13 is of the type designed to set in rotation a disk 14 by means of a elongated shape-memory element, for example, in the form of a wire or strip, wound in a spiral or else in a helix. An actuator device of this type forms the subject of the copending European patent application No. 06425135.8 filed in the name of the present applicant. Basically, it envisages a wire made of shape-memory material wound in a helix on a rotatable body and having one end fixed on said body and the opposite end connected to a fixed structure. The actuator device comprises electrical-supply means that can be actuated by the driver by means of a control pushbutton for example adjacent to the device 8, which causes the elongated shape-memory element to be traversed by electric current. Following upon passage of current, the elongated shape-memory element undergoes heating by the Joule effect above its transition temperature, so that the element tends to shorten, thus setting the disk-like body on which it is wound in rotation. Rotation of the disk 14 gives rise to a corresponding rotation of a toothed sector 15, which is rigidly connected to the disk 14 and rotates therewith around the respective axis of rotation 16. The toothed sector 15 in turn meshes with a sprocket wheel 17 (FIGS. 7 and 8) carried by one end of the winding shaft 10.

Thanks to the arrangement described above, activation of the shape-memory element causes rotation of the shaft for rolling-up of the blind from the condition corresponding to the inoperative position of the blind (FIGS. 3 and 5, 7) to the operative position (FIGS. 5 and 6, 8).

Figure 3:
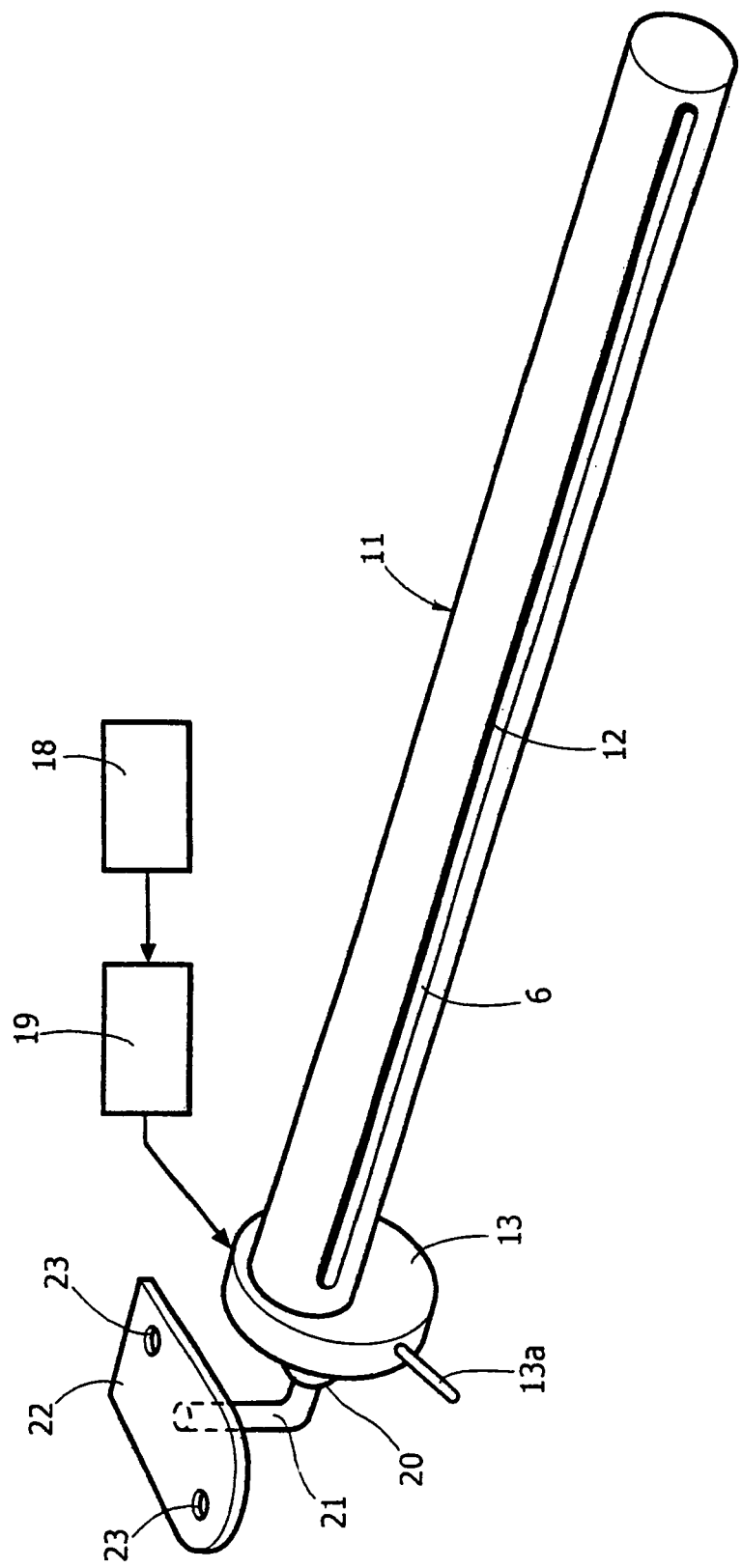
FIG. 3 is a schematic perspective view of the device according to the invention, in the inoperative condition.
Figure 4:
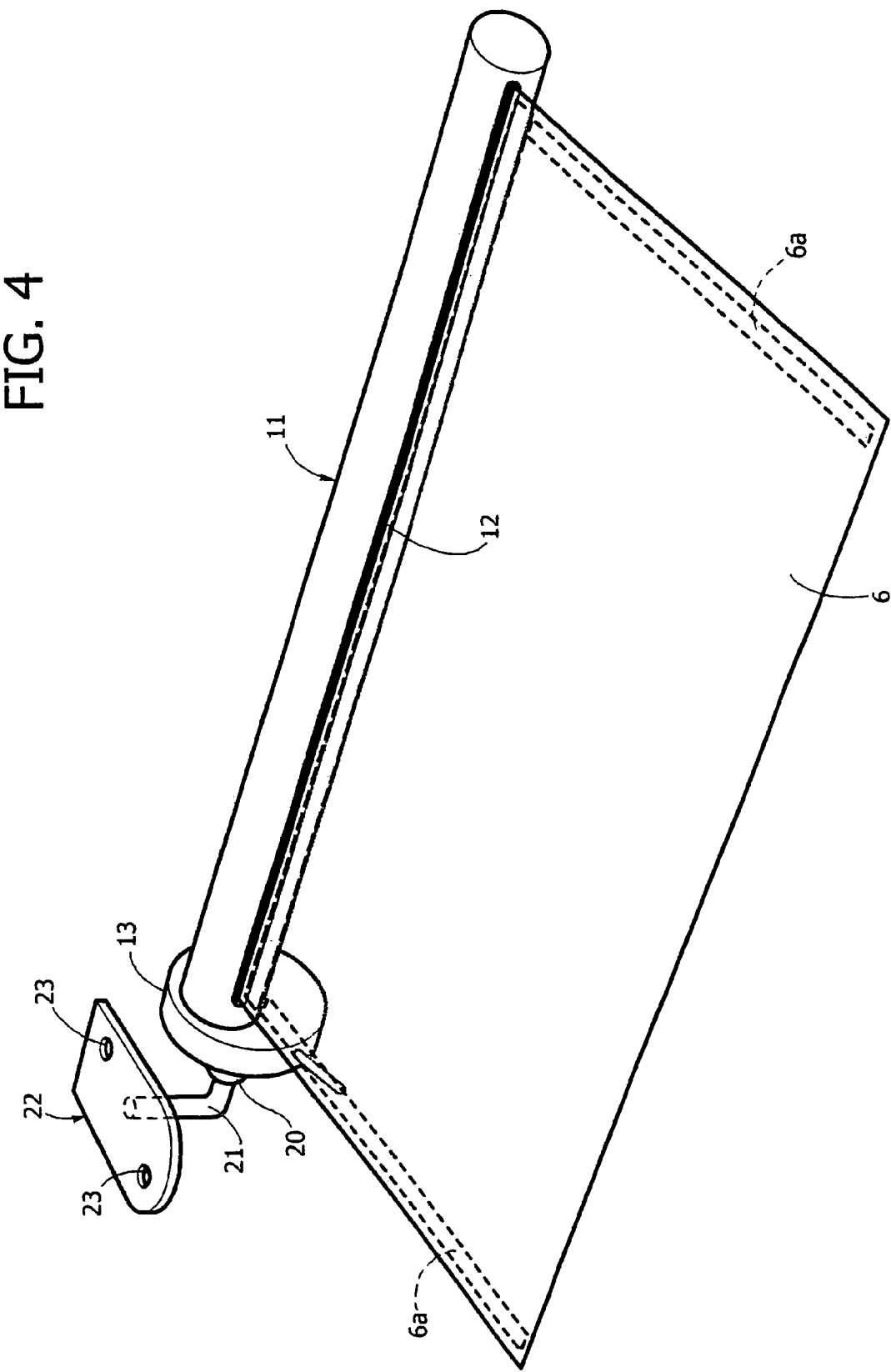
FIG. 4 is a perspective view of the device of FIG. 2, in the operative condition.

As already mentioned above, activation of the shape-memory actuator device 13 can be controlled by the user by operating a pushbutton, designated as a whole by 18 in FIG. 3, which transmits a signal to an electronic control unit 19, which provides electrical supply to the shape-memory actuator device 13.

In one embodiment, the device can be envisaged so as to maintain the blind 6 in the distended condition as long as the electrical supply of the shape-memory actuator is maintained. As said supply ceases, which can be obtained once again by actuating the control pushbutton 18, the shape-memory element cools down and returns into its original condition, and retraction of the blind 6 in the rolled-up condition is obtained by means of elastic-return means, for example in the form of a spiral spring associated to the disk 14 itself of the shape-memory actuator or to the winding roller 10.

However, according to the invention, it is considered advantageous to ensure that the blind 6 will remain in its operative extracted position without requiring maintenance of the electrical supply of the shape-memory actuator. The simplest way to obtain this result is to use a shape-memory actuator of a bistable type. An actuator of this type has, for example, formed the subject of the European patent No. EP-B-1 241 351 filed in the name of the present applicant. Basically, bistable operation is obtained by associating to the member driven by the shape-memory element either elastic means that tend to bring back the driven member into a resting position or a device for clamping the driven member in the operative condition into which it is brought when the shape-memory element is activated, the arrangement being such that, once the driven member has been clamped in its operative condition, a subsequent temporary activation of the shape-memory element causes de-activation of the aforesaid clamping device. In this way, the driven member is normally kept in its resting position by the aforesaid elastic means. Starting from this condition, if the shape-memory element is activated, the driven member is displaced into its operative condition, against the action of the aforesaid elastic means, until it causes engagement of the clamping device, after which the driven member remains in its operative condition even if the shape-memory element is de-activated. A subsequent activation of the shape-memory element causes de-activation of the clamping device and consequent return of the driven member into its resting position as a result of the elastic return means.

As an alternative to said solution, a first shape-memory element may be provided for causing displacement of the driven member from its resting position to its operative position, where it is clamped by an engagement device so as to enable de-activation of the first shape-memory element, as well as a second shape-memory element, which is designed to cause de-activation of the engagement device so as to bring about return of the driven member into its resting position under the action of elastic return means.

To return to the embodiment illustrated in FIGS. 3-8, the entire structure constituted by the casing 11 and the casing 13 connected at one end of the casing 11 is connected, by means of a ball-and-socket joint 20 located at the centre of the casing 13, to an L-shaped supporting pin 21, projecting from a bracket 22 provided with holes 23 for screws for fixing the bracket 22 to the structure of the motor vehicle. Moreover associated to the casing 13 is a gripping handle 13a, which enables manual orientation of the entire structure of the device exploiting the freedom of movement afforded by the ball-and-socket joint 20. In this way, the user can easily position the device 8 in the most convenient way, for example in a position corresponding to the windscreen of the motor vehicle or of a side window. In addition, the ball-and-socket joint 20 affords also the possibility of adjusting the angular position of the slit 12 from which the blind 6 comes out so as to vary, in the distended condition of the blind, the angle of inclination of the blind itself.

A further advantage of the device according to the invention is that it is always and in any condition manually controllable. For example, in the case of the embodiment described above with reference to FIGS. 3-8, at any moment the user can grip the end edge of the blind 6, when this is extracted in the condition of FIG. 4, and push it so as to cause it to enter within the casing. Otherwise, the blind can also be unrolled manually outside the casing. FIGS. 9-14 refer to a second embodiment. In said figures, the parts that are common to the ones of FIGS. 3-8 are designated by the same reference numbers. The main difference with respect to the embodiment described previously lies in the way the shape-memory actuator means are made. This embodiment does not envisage an actuator with wound shape-memory element, but rather two shape-memory wires 24 (see FIGS. 11 and 12) are provided, which run within the casing 11. Each wire 24 has one end 24a fixed to the casing 11, and the opposite end engaged around a pulley 25 mounted so that it can rotate about an axis 26 on the structure of the casing 11 (see also FIGS. 13 and 14). Each pulley 25 supports in rotation a flattened metal arm 27 having one end connected in rotation with the respective pulley 25 and the opposite end articulated in 28 on a slider 28a which is able to slide along a cross member 29 (see FIG. 10) fixed to the free edge of the blind 6. Activation of the two shape-memory wires 24 causes rotation of the two pulleys 25 and consequent oscillation of the two arms 27 from the retracted and mutually aligned condition illustrated in FIGS. 9 and 11 into the condition where they are rotated through 90° of FIGS. 10 and 12.

Figures 9, 15:
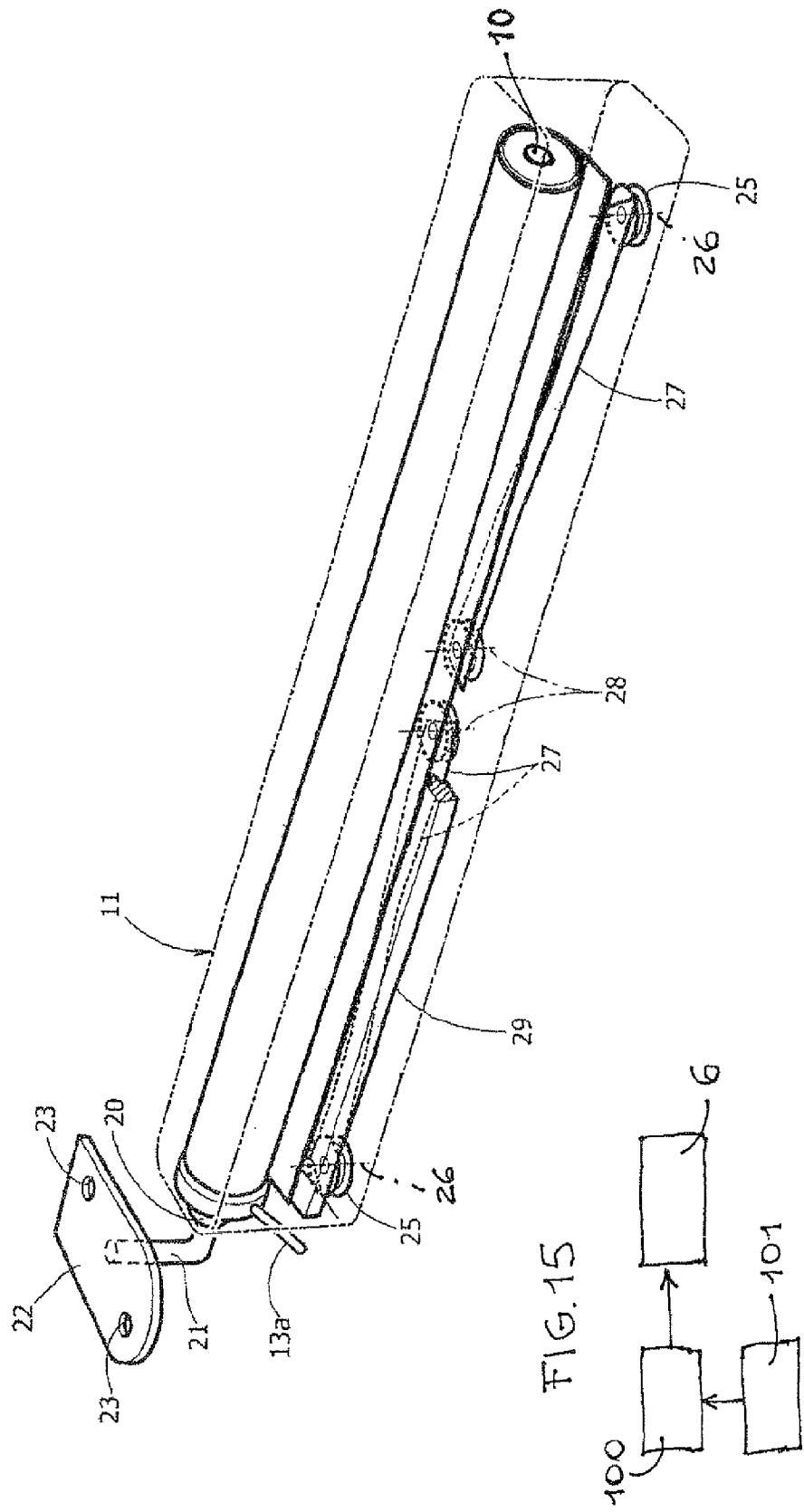
FIGS. 9 and 10 are perspective views of a second embodiment of the device according to the invention in the inoperative condition and in the operative condition, respectively.
FIG. 15 shows a block diagram showing further elements of the device of FIGS. 9-14.
Figure 10:
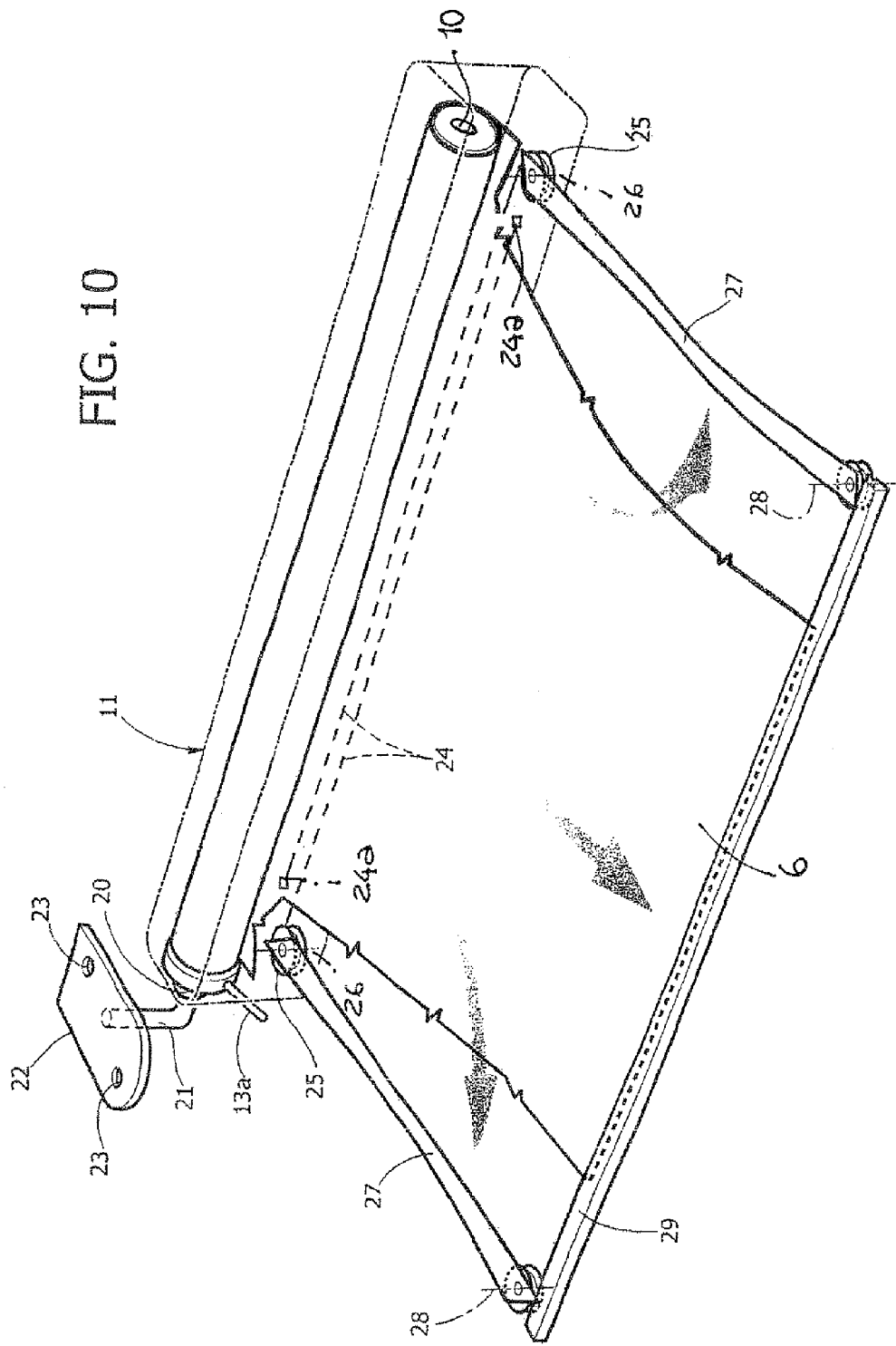
Figure 11:
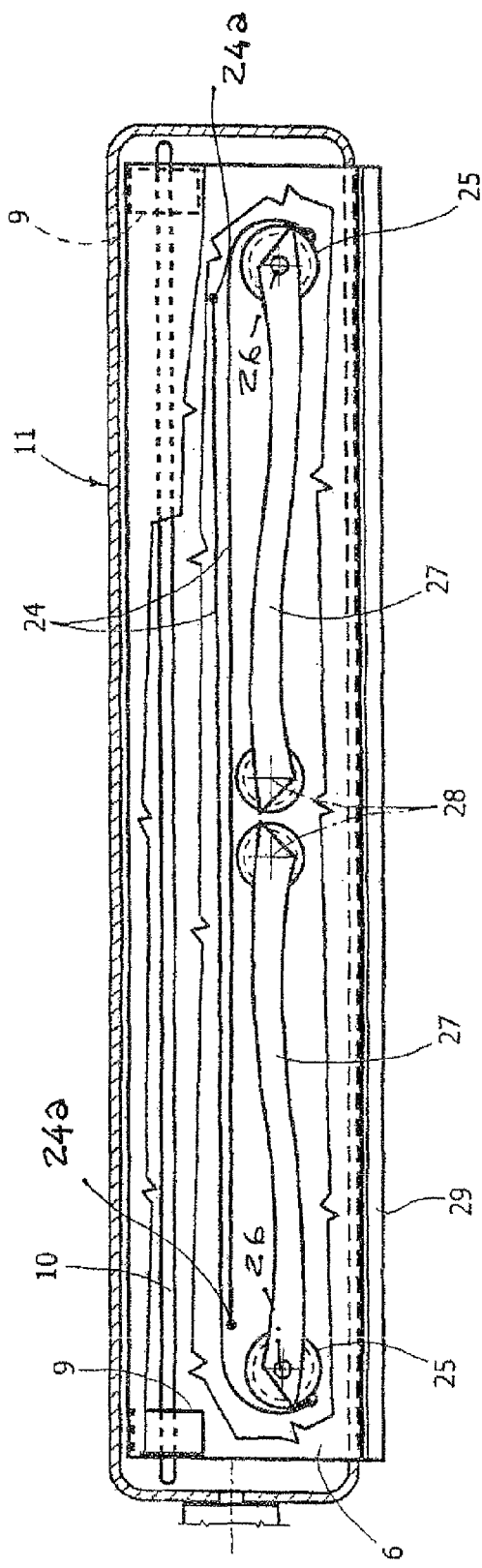
FIGS. 11, 12 and 13, 14 show the aforesaid two operative conditions of the device of FIGS. 9 and 10 in a front view and in a side view, respectively.
Figure 13:
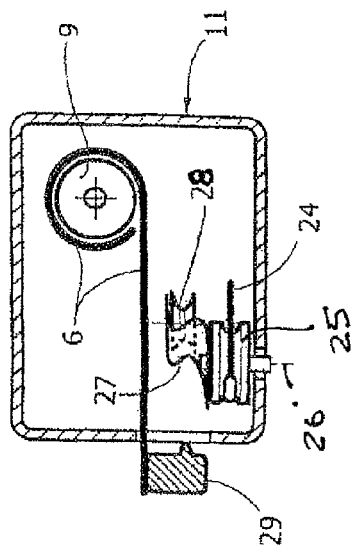
Figure 12:
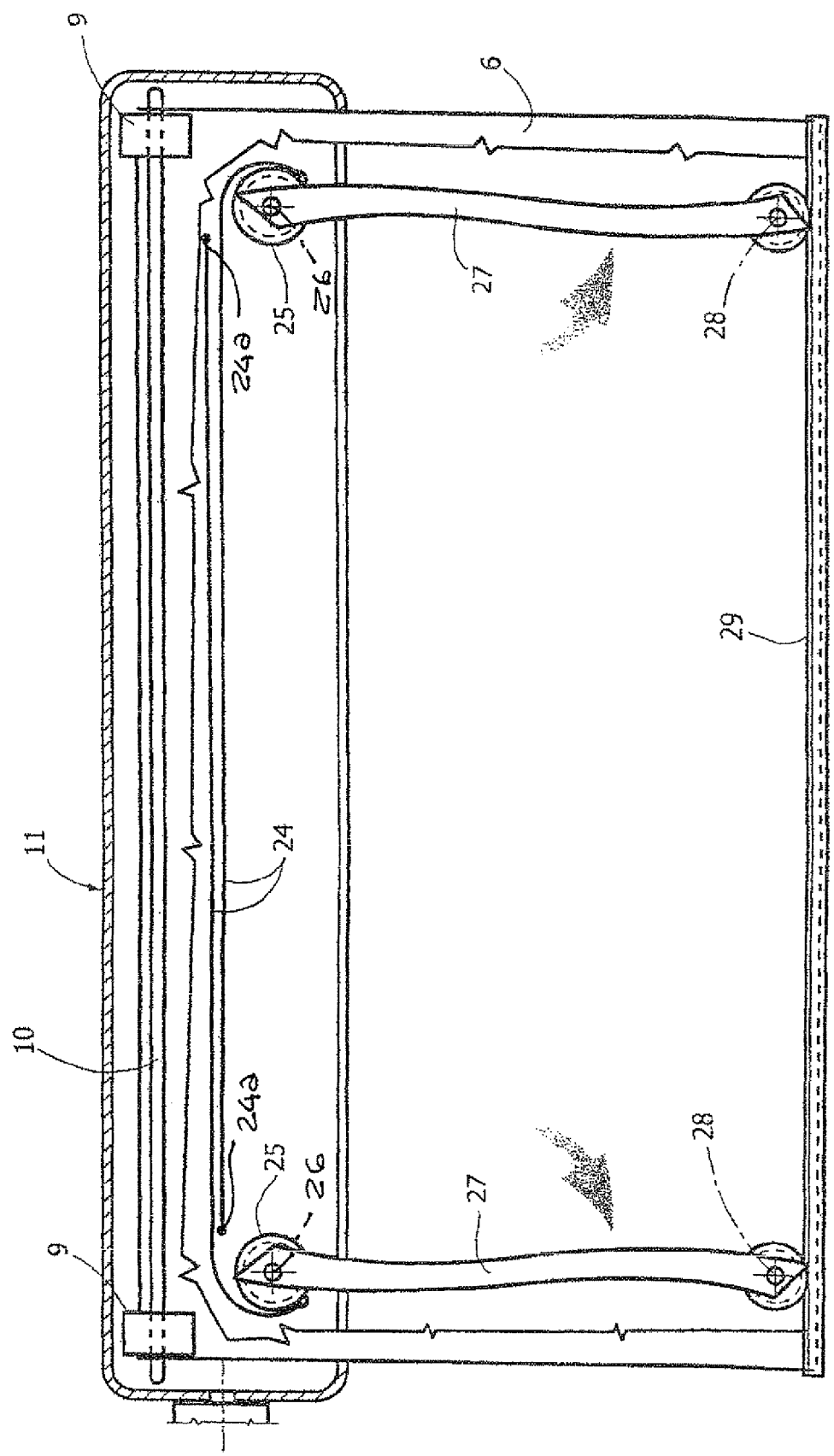
Figure 14:
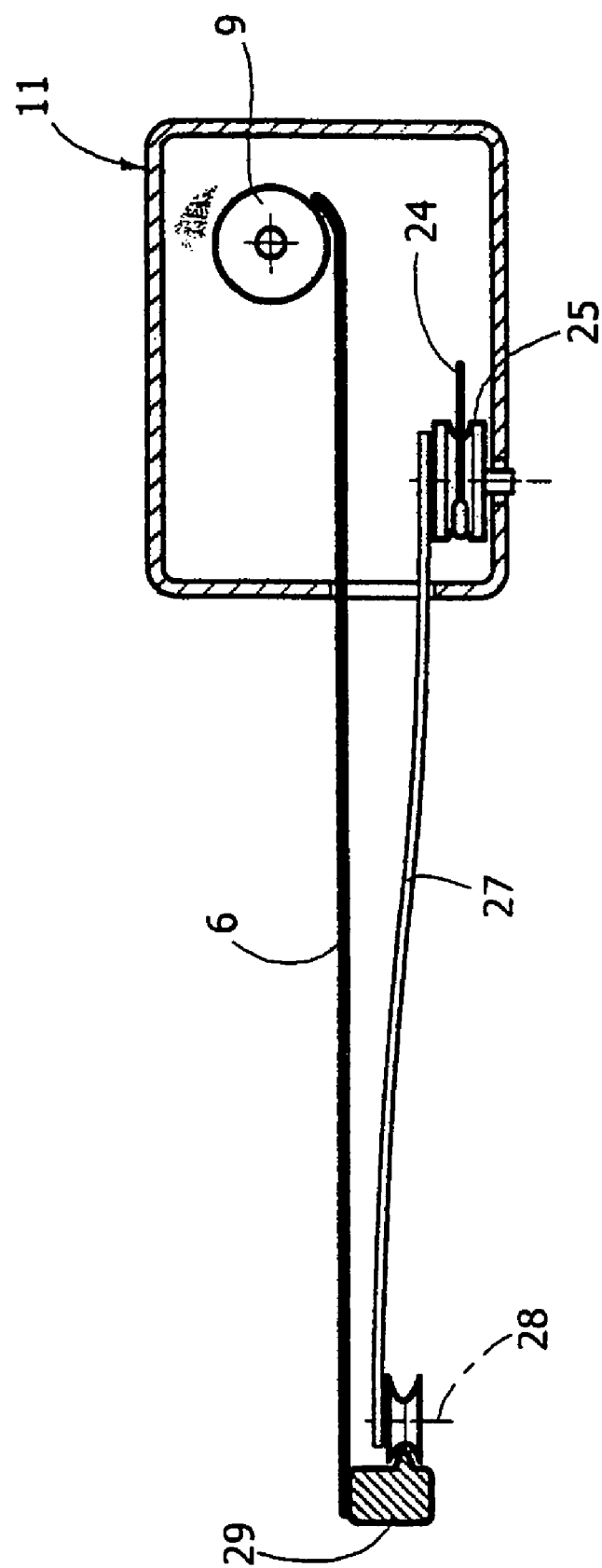

Associated to the pulleys 25 are, for example, spiral springs, tending to bring back the arms 27 into the retracted condition illustrated in FIG. 9. In a way similar to what has been described above with reference to the first embodiment, once the shape-memory element is activated, it can be kept in said condition by maintaining the electrical supply of the shape-memory element. Upon ceasing of the electrical supply, the springs associated to the pulleys 25 bring back the blind into the retracted condition. Once again in a way similar to what has been described with reference to the first embodiment, it is, however, possible to provide a device 100 (see FIG. 15) for engaging the blind 6 in the distended condition, which enables the blind itself to be kept in said condition even after de-activation of the shape-memory element. In this case, it is necessary to provide means 101 (FIG. 15) for de-activation of the engagement device in order to bring the blind back into the retracted condition. Said result can be obtained, for example, by providing a further shape-memory element (not illustrated), which is activated by the user when he presses the pushbutton 18 for governing rolling of the blind 6.

Of course, without prejudice to the principle of the invention, the details of construction and the embodiments may vary widely with respect to what is described and illustrated herein purely, by way of example, without thereby departing from the scope of the present invention.

What is claimed is:

1. A sunshade device for motor vehicles, comprising
a sunshade in a form of a roller-blind device, including:
a supporting structure in a form of a hollow elongated casing,
a shaft rotatably mounted within said hollow casing,
a blind connected to said shaft and movable between an inoperative condition rolled up on said shaft and an operative unrolled condition, in which the blind extends in a plane outside said casing through a longitudinal aperture of said casing,
wherein said supporting structure is connected via a ball-and-socket joint to a bracket to be secured to the structure of the motor vehicle adjacent to the edge of a vehicle windshield, so that it can be oriented along said edge or adjacent to a vehicle side window,
wherein said sunshade device further includes:
two arms having first ends pivotally mounted inside said hollow casing, adjacent to the two ends thereof, around parallel axes which are orthogonal to said plane of the unrolled blind,
said arms being movable between
an inoperative position corresponding to the inoperative condition of the blind, in which the arms are oriented parallel to the blind shaft, and located within the hollow casing, with their second ends facing each other, and
an operative position corresponding to the operative condition of the blind, in which the arms project outside said longitudinal aperture of the hollow casing orthogonally thereto,
said second ends of said two arms pivotally supporting respective sliders that can slide along a cross member fixed to the free edge of the blind, in such a way that said arms cause unrolling of the blind when they are moved from said inoperative positions to said operative position, wherein said two arms have said first ends connected to two respective pulleys which are rotatably supported inside said casing around said axes of rotation of said two arms, wherein said sunshade device further includes shape memory actuating means for controlling displacement of said arms from said inoperative position to said operative position, said shape memory actuating means comprising:

a pair of shape-memory wires for causing rotation of said pulleys, each wire having one end connected to the respective pulley and a portion extending from the pulley parallel to said blind shaft up to a fixed end connected to said casing adjacent to the other pulley, means for supplying an electric current through said shape-memory wires, so as to cause a heating of said shape-memory wires beyond a transition temperature above which they are subject to a shortening, which causes rotation of said pulleys and movement of said arms towards their operative positions projecting outwardly from said hollow casing, thus bringing the blind in its unrolled condition.

2. Sunshade device as set forth in claim 1, wherein an engagement device is provided for holding said blind in the unrolled condition after de-activation of the shape-memory wires.

3. Sunshade device as set forth in claim 2, wherein means are provided for causing de-activation of said engagement device in order to bring the blind back into a retracted condition.

4. Sunshade device as set forth in claim 3, wherein said means for de-activation said engagement device are a further shape memory actuator which is activated by a user when the user presses a pushbutton for causing rolling of the blind.

* * * * *